United States Patent
Elam et al.

(10) Patent No.: US 10,180,510 B2
(45) Date of Patent: Jan. 15, 2019

(54) MULTIPLEXING SIGNATURE ALLOCATION FOR WIRELESS EXPLORATION SYSTEM

(71) Applicant: Wireless Seismic, Inc., Louisville, CO (US)

(72) Inventors: David Elam, Richmond, TX (US); Jerry Stair, Richmond, TX (US)

(73) Assignee: Wireless Seismic, Inc., Sugar Land, TX (US)

( * ) Notice: Subject to any disclaimer, the term of this patent is extended or adjusted under 35 U.S.C. 154(b) by 874 days.

(21) Appl. No.: 14/175,868

(22) Filed: Feb. 7, 2014

(65) Prior Publication Data
US 2014/0340989 A1 Nov. 20, 2014

Related U.S. Application Data

(60) Provisional application No. 61/762,647, filed on Feb. 8, 2013.

(51) Int. Cl.
*G01V 1/22* (2006.01)

(52) U.S. Cl.
CPC .................. *G01V 1/22* (2013.01)

(58) Field of Classification Search
USPC .......................................... 367/76
See application file for complete search history.

(56) References Cited

U.S. PATENT DOCUMENTS

| 3,886,494 | A | * | 5/1975 | Kostelnicek | G01V 1/223 367/74 |
|---|---|---|---|---|---|
| 7,218,890 | B1 | * | 5/2007 | Iseli | G01V 1/223 340/521 |
| 7,613,071 | B2 | * | 11/2009 | Iseli | G01V 1/223 367/77 |
| 7,773,457 | B2 | | 8/2010 | Crice et al. | |
| 2005/0114033 | A1 | * | 5/2005 | Ray | G01V 1/223 702/14 |
| 2005/0259514 | A1 | * | 11/2005 | Iseli | G01V 1/223 367/79 |
| 2006/0035643 | A1 | * | 2/2006 | Vook | H04L 5/0094 455/450 |
| 2008/0049554 | A1 | * | 2/2008 | Crice | G01V 1/223 367/79 |
| 2009/0225629 | A1 | * | 9/2009 | Ray | G01V 1/223 367/77 |

(Continued)

Primary Examiner — James R Hulka
(74) Attorney, Agent, or Firm — Marsh Fischmann & Breyfogle LLP (57) ABSTRACT

Systems and methods related to allocation of multiplexing signatures to wireless data acquisition modules in a seismic array with real time wireless read out. The allocation may include selecting an index value offset from an adjacent index value to form serial data transfer paths wherein reuse of multiplexing signatures are spaced as far apart as possible in serial data path. In an embodiment the allocation of multiplexing signatures may be adaptive wherein a module may scan for the presence of signals utilizing a plurality of multiplexing signatures and in turn employ a multiplexing sequence that avoids any detected noise that could lead to interference. The detected noise may be attributable to sources within the survey area or from ambient noise present in the area.

20 Claims, 7 Drawing Sheets

(56) References Cited

U.S. PATENT DOCUMENTS

| | | | |
|---|---|---|---|
| 2010/0128565 A1* | 5/2010 | Golparian | G01V 1/223 367/79 |
| 2011/0096628 A1* | 4/2011 | Golparian | G01V 1/223 367/77 |
| 2011/0116344 A1* | 5/2011 | Crice | G01V 1/223 367/76 |
| 2011/0149686 A1* | 6/2011 | Ray | G01V 1/223 367/77 |
| 2011/0158047 A1* | 6/2011 | Beffa | G01V 1/223 367/40 |
| 2012/0170408 A1* | 7/2012 | Crice | G01V 1/223 367/80 |
| 2012/0250457 A1* | 10/2012 | Rickert, Jr. | G01V 1/3808 367/20 |
| 2013/0135968 A1* | 5/2013 | Beffa | G01V 1/223 367/50 |
| 2013/0148470 A1* | 6/2013 | Crice | G01V 1/223 367/80 |
| 2014/0269187 A1* | 9/2014 | Elder | G01V 1/223 367/77 |
| 2014/0307523 A1* | 10/2014 | Elder | G01V 1/22 367/25 |
| 2014/0340988 A1* | 11/2014 | Crice | G01V 1/223 367/76 |

* cited by examiner

MULTIPLEXING SIGNATURE ALLOCATION FOR WIRELESS EXPLORATION SYSTEM

CROSS-REFERENCE TO RELATED APPLICATION

This application claims priority from U.S. Provisional Application No. 61/762,647, filed on Feb. 8, 2013, the contents of which are incorporated herein as if set forth in full.

BACKGROUND

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

In general, as more sensors are used, placed closer together, and/or cover a wider area, the quality of the resulting image will improve. It has become common to use thousands of sensors in a seismic survey stretching over an area measured in square kilometers. Hundreds of kilometers of cables may be laid on the ground and used to connect these sensors. Large numbers of workers, motor vehicles, and helicopters are typically used to deploy and retrieve these cables. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

Accordingly, wireless techniques have been proposed to eliminate the need to provide cables between sensors in an array. For example, U.S. Pat. No. 7,773,457 issued to the present assignee discloses such a system and is hereby incorporated herein by reference in its entirety. However, as the number of sensors used in an array increases, the potential for interference between modules also increases. That is, as sensors are introduced into a common area, the likelihood that modules experience interference or cross talk increases. In this regard, interference between modules may lead to communication difficulties ultimately reducing the available bandwidth of the system. As such, slower data transfer rates may be experienced and the seismic survey may be slowed or interrupted, leading to increase time and cost of the survey.

SUMMARY

In light of the foregoing, it has been recognized by the present inventors that multiplexing signatures may be used by modules to reduce or eliminate interference between modules communicating in a seismic survey using wireless techniques to achieve data read out. Specifically, multiplexing signatures may be allocated to wireless modules in an array so as to reduce the potential for cross talk or interference between modules in the array. These multiplexing signatures may be allocated according to a predetermined allocation regime or may be adaptive.

A first aspect includes a method for adaptive allocation of multiplexing signatures to a wireless module in a seismic data acquisition system. The method includes first scanning with a first wireless module in the seismic data acquisition system for use of each of a plurality of predetermined multiplexing signatures during a plurality of transmission time periods. The method also includes first selecting at the first wireless module one of the plurality of predetermined multiplexing signatures for wireless exchange of seismic data between the first wireless module and another wireless module in the seismic acquisition system for each of the plurality of transmission time periods. The method further includes that the first selecting includes choosing a different one of the plurality of predetermined multiplexing signatures for use during each of the transmission time periods based on the first scanning to develop a first multiplexing sequence for the first wireless module.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, the plurality of transmission time periods may correspond to the number of predetermined multiplexing signatures. In an embodiment, the first selecting may include choosing the different ones of the plurality of multiplexing signatures for each of the plurality of transmission time periods to minimize interference from competing multiplexing signatures detected during the first scanning. In this regard, the competing multiplexing signatures may correspond to ambient interference. Additionally, the first wireless module may provide information indicative of the multiplexing sequence to an upstream acquisition module with which the first wireless module communicates to transmit seismic data. The first wireless module and the upstream acquisition module may use the first multiplexing sequence when communicating seismic data therebetween.

In this regard, in an embodiment, the method may include communicating data between the first wireless module and the upstream wireless module using the multiplexing sequence such that each multiplexing signature of the multiplexing sequence is used for the entirety of the respective transmission period for which the multiplexing signature has been chosen. At least a portion of the communication between the first wireless module and the upstream wireless module may comprise idle data. In this regard, it may be that the use of the channel may be represented in the transmission of the idle data (e.g., so as to be detected by other modules performing scanning).

In this regard, the method may include second scanning, subsequent to the first selecting, at a second wireless module in the seismic data acquisition system for use of each of the plurality of predetermined multiplexing signatures during the plurality number of transmission time periods and second selecting at the second wireless module one of the plurality of predetermined multiplexing signatures for wireless exchange of seismic data between the second seismic module and another wireless module in the seismic acquisition system for each of the plurality of transmission time periods. The second selecting may include choosing a different one of the plurality of predetermined multiplexing signatures for use during each of the transmission time periods based on the second scanning to develop a second multiplexing sequence for the second wireless module. The second scanning may detect the use of the first multiplexing sequence during each of the plurality of transmission time periods.

In an embodiment, the second acquisition module may comprise the upstream acquisition module. Each acquisition module may choose a corresponding multiplexing signature sequence by sequentially performing corresponding scanning and selecting steps. That is, each module in an array may subsequently perform the method of the first aspect. In an embodiment, each module may successively perform the method in a direction along a serial data transfer path away from a base station or central collection unit.

In an embodiment, the corresponding multiplexing signature sequence may be stored by each corresponding one of the plurality of wireless modules at least until a location of the wireless module is changed. The method of the first aspect may be performed prior to initiation of a seismic survey. Additionally or alternatively, the method may be performed during a seismic survey. The plurality of predetermined multiplexing signatures may include different transmission frequencies and the scanning comprises detecting energy on the different transmission frequencies.

A second aspect includes a method for allocation of multiplexing signatures to a plurality of wireless modules in a seismic data acquisition system. The method includes programming each of said plurality of wireless modules with a multiplexing sequence, wherein the multiplexing sequence defines a series of hops among a plurality of pseudorandom multiplexing signatures. The method may also include deploying each of said plurality of wireless modules in a survey area, wherein at least a portion of said plurality of wireless modules in the survey area are capable of interference, and wherein said plurality of wireless modules comprise a substantially ordered pattern in the survey area. The method further includes first transmitting data at a first wireless module of the plurality of wireless modules using a first multiplexing signature of multiplexing sequence and second transmitting data at a second wireless module of the plurality of wireless modules using the first multiplexing signature of the multiplexing sequence, wherein at least a portion of the first transmitting and the second transmitting occur in a common time period. The first wireless module and the second wireless module may be separated within the substantially ordered pattern by a number of transmitting module pairs at least equal to the number of multiplexing signatures in the multiplexing sequence.

A number of feature refinements and additional features are applicable to the second aspect. These feature refinements and additional features may be used individually or in any combination. As such, each of the following features that will be discussed may be, but are not required to be, used with any other feature or combination of features of the second aspect.

For example, in an embodiment, each adjacent transmitting pair of wireless modules may be separated within the multiplexing sequence by a number of index positions, wherein the number of index positions is not a multiple of a total number of multiplexing signatures in the multiplexing sequence. The total number of multiplexing signatures in the multiplexing sequence may be a prime number. The programming may include providing each module instructions regarding an offset relative to an index value corresponding to the multiplexing sequence.

A third aspect includes a wireless module for use in a seismic survey. The module includes a sensor operable to detect seismic energy and generate seismic data corresponding to the detected seismic energy. The module also includes a transceiver in operative communication with the sensor to communicate the seismic data to at least one of another wireless acquisition module or a data collection unit. The module includes a processor in operative communication with the transceiver to control operation thereof and a memory storing a multiplexing sequence. The multiplexing sequence may include a plurality of multiplexing signatures each referenced by a corresponding index value. The processor may be operable to read the multiplexing sequence from the memory to transmit the seismic data using a multiplexing signature of the multiplexing sequence. Additionally, the processor may be operable to receive an indication of an adjacent index value used by an adjacent module and select the index value at least partially based on the adjacent index value.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For example, the index value may be selected based on an offset from the adjacent index value. The adjacent index value may be received from an adjacent wireless module more adjacent to a data collection unit than the wireless module. The total number of multiplexing signatures in the multiplexing sequence may not a multiple of the value of the offset.

BRIEF DESCRIPTION OF THE DRAWINGS

FIG. 5 depicts an embodiment of an index table showing use of multiplexing signatures in an array over a period of time.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 1:
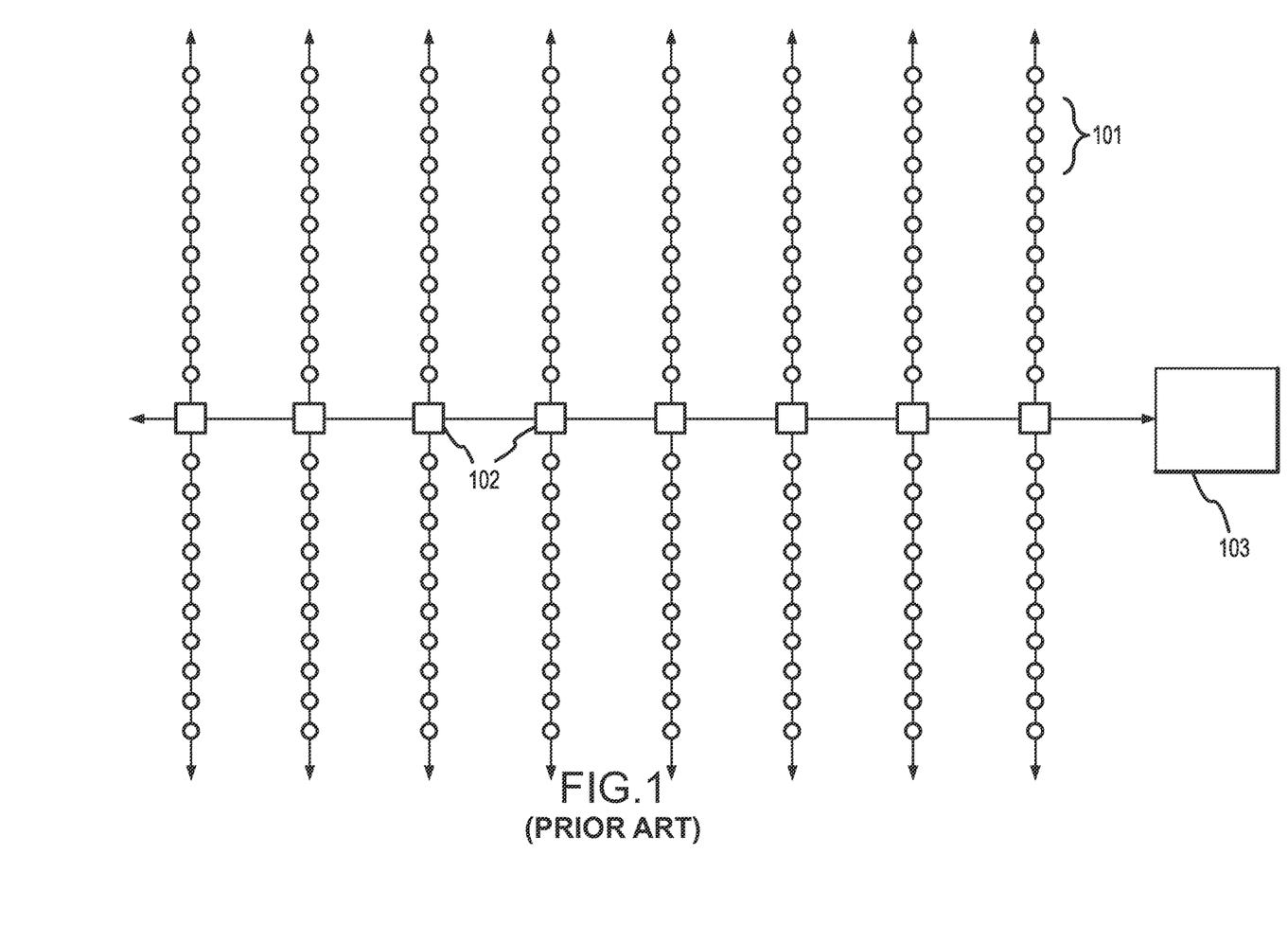
FIG. 1 depicts a conventional seismic survey with wired collection modules for relaying seismic data.

FIG. 1 depicts a common physical layout of a conventional seismic survey. A number of remote data acquisition modules 101 are connected by cables in a line and arrayed on the ground. Connected to each of the modules is one or more sensors configured as individual sensors, multi-component sensors, or strings of sensors wired into groups. Each of the modules may contain electronics to amplify, digitize, and store the signals from the sensors, or in the case of digital sensors, collect and store the data. The remote data acquisition modules may contain additional circuitry to test the sensors and/or the acquisition circuitry to ensure proper function and performance.

The remote modules are connected together in a line by electrical or fiber optic cables, and the line is connected to a second device called a "line tap" or "crossline unit" 102. The line taps are then connected together in a string, and eventually to a central control and recording system 103. The line tap 102 and/or central control and recording system 103 that has no data collection capability may generally be referred to as a data collection unit.

Seismic data is generally acquired and passed down the cables from the remote data acquisition modules 101 to the line taps 102, and thence to the central control and recording system 103. Instructions and timing signals are passed up the cables from the central control and recording system 103 to the line taps 102 and thence to the remote data acquisition modules 101. Other geometries may be used, including just a linear array. Redundant lines or a ring topology may be used to provide alternate data and control paths in the event of failures or obstructions. The number of sensors deployed may vary considerably depending on the requirements of the survey. If one of the lines must be discontinuous because of some obstruction, such as a river, a radio frequency communication system may be inserted to carry the data and instructions across the gap. In any regard, one or more serial data transfer paths may be defined by the remote modules 101 to relay data from remote modules 101 to the data collection units. These serial data transfer paths may be transient and may vary throughout the survey or may be relatively fixed for the duration of the survey.

The central control and recording system 103 usually consists of a computer with a display, keyboard, interface to the line tap string, and digital storage system. In one implementation, the central control and recording system might consist of a standard notebook computer with an Ethernet, USB, or wireless interface to connect to a line tap string or to an interface device that connects to the line tap string. Data may be stored on the computer's internal hard disk. For larger systems, the central control and recording system might consist of a larger computer with separate display and keyboard and separate storage device such as a tape drive, one or more hard disks, or some other storage device consistent with storing relatively large amounts of data.

In the present disclosure, wireless data acquisition and relay modules 200 may replace the conventional wired units 101. The positions of the wireless remote modules might be the same as in a wired system, or the array might be adapted to exploit the flexibility of a wireless system. That is, the acquisition modules can be arranged in substantially any pattern and serial communications of seismic data can occur along substantially any route (e.g., along a serial data transfer path defined among the wireless data acquisition modules) in order to report information to a central control and recording system 103.

Figure 3:
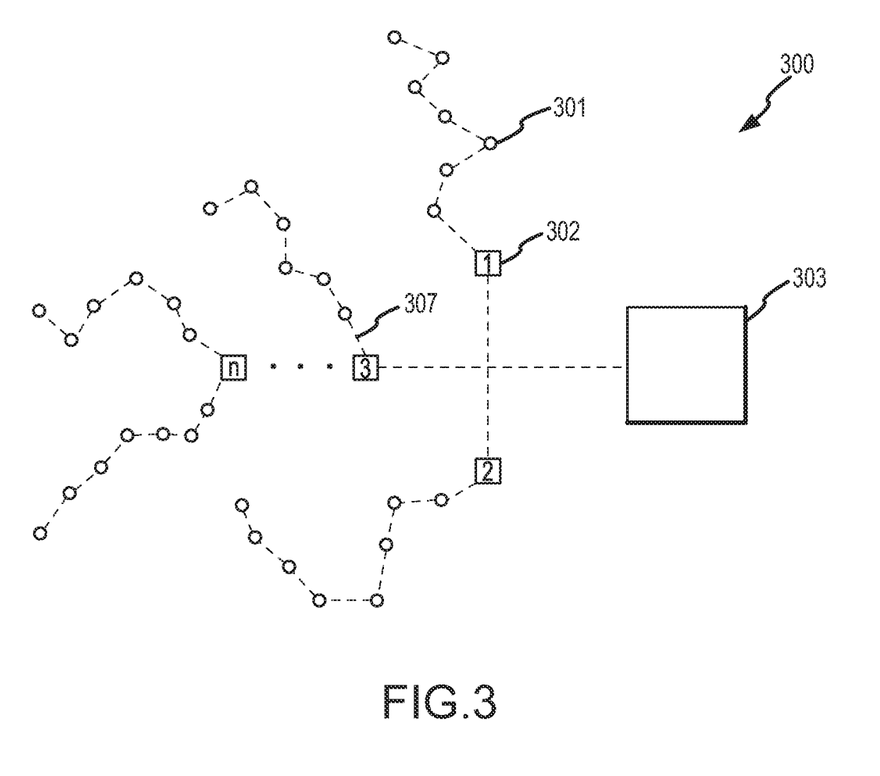
FIG. 3 depicts an embodiment of a cableless seismic data acquisition system deployed in a survey area in a non-geometrical distribution.

FIG. 3, for example, shows a layout of a wireless seismic survey system 300 in accordance with one embodiment of the present invention. The system 300 includes data acquisition modules 301 which are distributed throughout a seismic survey site. As shown, the acquisition modules 301 may be deployed in a substantially linear pattern. In an embodiment, the modules may be provided with equidistant spacing between adjacent modules in each serial data transfer path. The data acquisition modules 301 are configured to communicate with surrounding modules through wireless links 307. Generally, seismic data is wirelessly forwarded from data acquisition modules 301 that are more remotely located to a central control and recording system 303 to those that are less remote until the data reaches the central control and recording system 303. As shown, the data may be forwarded by the data acquisition modules 301 until it reaches a base station 302. This base station 302 may be capable of transferring and receiving data between the central control and recording system 303 by any suitable method (e.g., Ethernet, USB, fiber-optic link, some computer compatible wireless interface such as IEEE 802.11, etc.). Additionally the base stations 302 may simply be data acquisition modules that are configured to communicate directly with the central control and recording system 303.

FIG. 3 illustrates that the layout of the data acquisition modules need not be a linear array, or any regular geometric configuration. This may be advantageous because it allows the survey system to operate around obstructions, and allows freedom for survey designers to choose a layout that will optimize the performance of the system. In this case, however, the spacing between modules may still be substantially regular even if a regular geometric pattern is not established.

Figure 4:
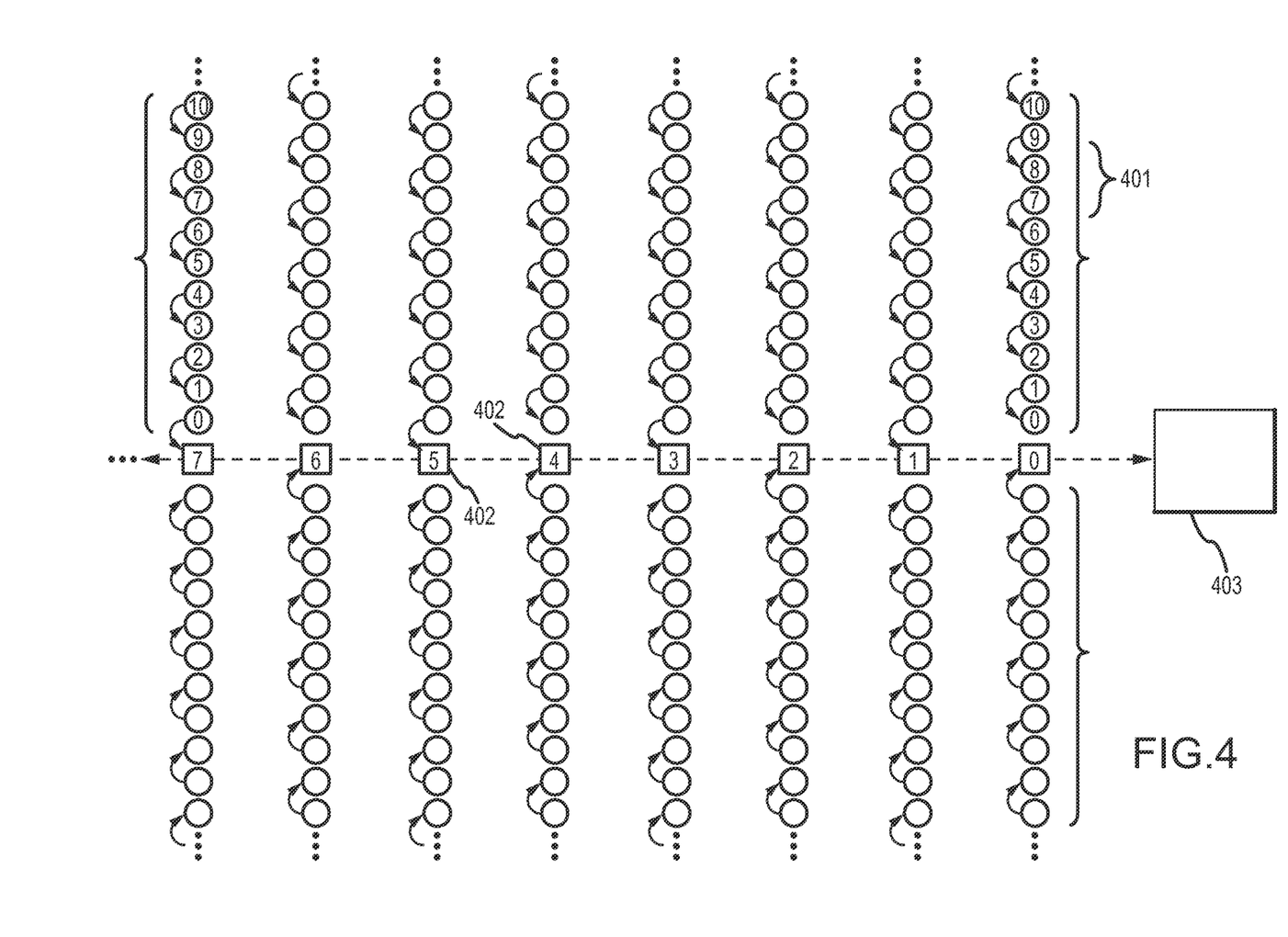
FIG. 4 depicts an embodiment of a cableless seismic data acquisition system deployed in a survey area in a regular geometric distribution.

Alternatively, as shown in FIG. 4, a wireless seismic survey system 400 may be provided with a geometric layout similar to the modules depicted in FIG. 1 (i.e., a regular geometric distribution in a grid or the like). Accordingly, remote wireless modules 401 may transmit data using wireless links 407 along a serial data path potentially comprising one or more other wireless modules 401 until data reaches a base station 402 that may further transmit data to a central control and recording system 403.

Regardless of the specific layout of modules in the array, it will be appreciated that the data path of the seismic data between the data acquisition modules may be manually or automatically configured. In the former case, each module may be programmed, for example, to communicate with predetermined modules that will be placed immediately adjacent or within communication distance to each other. Alternatively, the modules may be configured to automatically detect and select an optimal path for the seismic data to be transferred. In this latter case, the modules may be positioned without needing to place particular modules in particular locations. Then, the modules may select an optimal data path based on various factors such as obstructions, signal strength, transfer rates, etc.

An important aspect of the present disclosure is the capability to provide for rapid capture of data from a wireless array. That is, the system can operate more efficiently and inexpensively if the data capture can be accomplished without delaying the survey process due to bandwidth limitations or the like. In order to achieve this goal, it will be appreciated that the seismic data may be either be stored locally (e.g., at a module base station or other collection station), in whole or in part, for the entire survey, or otherwise transferred to a central control and recording system in a manner which does not interfere with or delay the operation of the seismic source event (e.g., explosive charge, vibration truck operation, weight drop, etc.). The present disclosure provides a system for wireless transfer of seismic data which may assist in facilitating this goal. In one embodiment of the present invention, all of the seismic data for a seismic event is transferred from the data acquisition modules to the central control and recording system, or other storage system, in no more than about 20 seconds from the end of the seismic event. This may be achieved by selecting data transfer rates, the number of data acquisition modules in the array and in each serial data transfer line, and other factors such as multiplexing techniques to avoid interference between modules.

Figure 2:
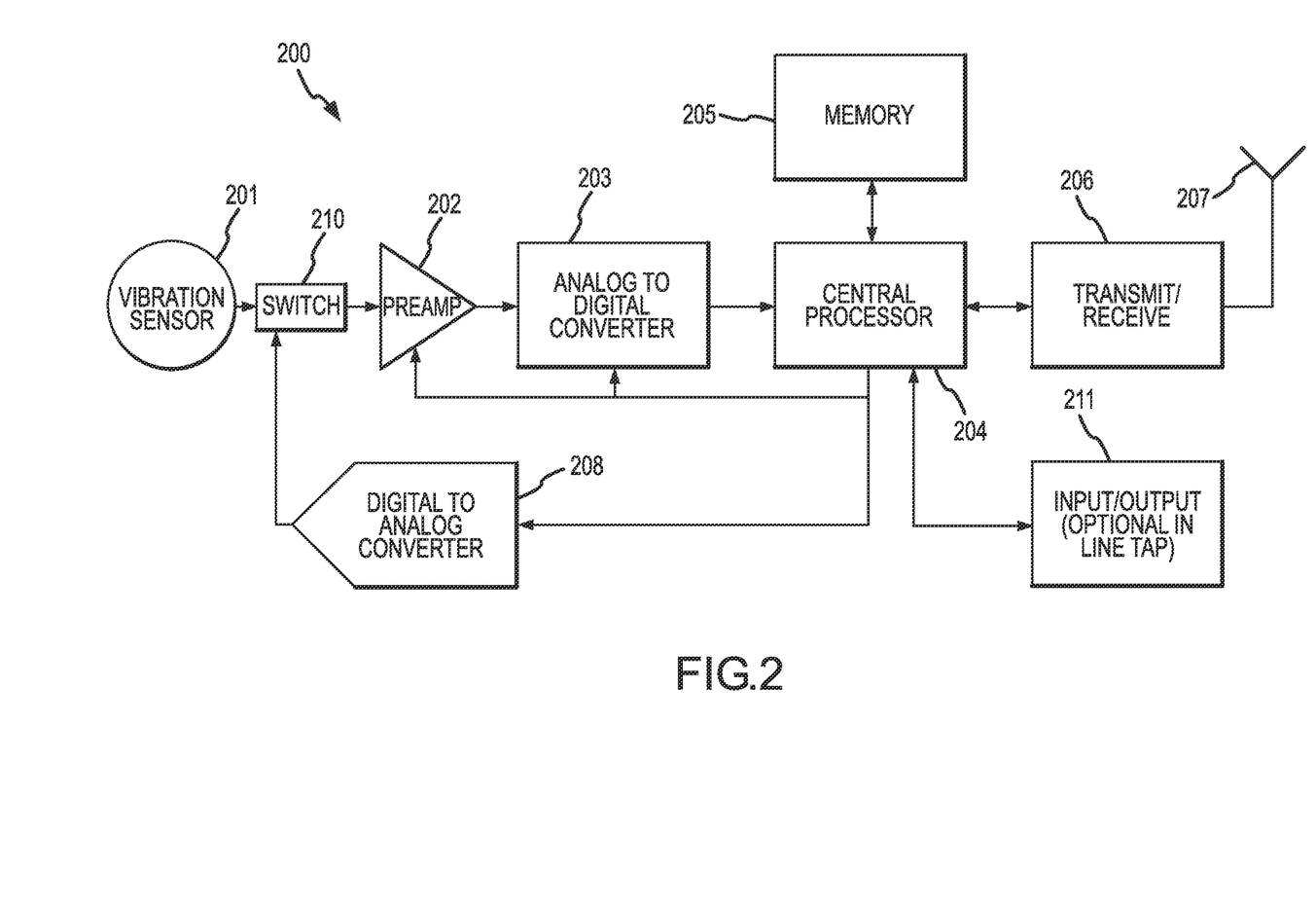
FIG. 2 is a schematic view of an embodiment of a wireless acquisition module.

FIG. 2 shows a block diagram of a wireless remote acquisition and relay module 200 in accordance with an embodiment of the present invention. A vibration sensor 201 converts vibrations into electrical signals which are fed through switch 210 to preamplifier 202 and thence to the analog to digital (A/D) converter 203. The digital data from the A/D converter 203 is fed into the central processor 204 or directly into a digital memory 205. Alternately, in the case of a sensor 201 with direct digital output, the signals may flow directly to the processor 204 or memory 205.

In addition to controlling the system and storing the data in the memory, the processor 204 may perform some calculations on the data including decimation, filtering, stacking repetitive records, correlation, timing, etc. The remote module 200 may also receive information through the transceiver 206, for example: timing information, cross-correlation reference signals, acquisition parameters, test and programming instructions, location information, seismic data from upstream modules and updates to the software among other commands. The transmit and receive signals couple through antenna 207.

The processor 204 can control the transceiver 206, including transmit/receive status, frequencies, power output, and data flow as well as other functions required for operation. The remote module 200 can also receive data and commands from another remote module or base station, store them in the memory, and then transmit them again for reception by another remote module up or down the line.

A digital-to-analog (D/A) converter 208 may be included in the system which can accept digital data from the processor 204 to apply signals through a switch 210 to the input circuitry. These signals, which may for example consist of DC voltages, currents, or sine waves, can be digitized and analyzed to determine if the system is functioning properly and meeting its performance specifications. Typical analysis might include input noise, harmonic distortion, dynamic range, DC offset, and other tests or measurements. Signals may also be fed to the sensor 201 to determine such parameters as resistance, leakage, sensitivity, damping and natural frequency. The power supply voltage may also be connected through the switch 210 to the A/D converter 203 to monitor battery charge and/or system power. The preamplifier 202 may have adjustable gain set by the processor 204 or other means to adjust for input signal levels. The vibration sensor 201 may be a separate generic unit external to the remote module 200 and connected by cables, or the sensor 201 might be integral to the remote module package.

If the remote module 200 is to be used as a base station, equivalent to a "line-tap" or interface to the central recording system, it will also have a digital input/output function 211 which may be, for example, an Ethernet, USB, fiber-optic link, or some computer compatible wireless interface (e.g., one of the IEEE 802.11 standards) or another means of communication through a wired or radio link. It may be acceptable to use larger battery packs for the line tap wireless data acquisition and relay modules because they will normally be relatively few in number and may communicate over greater distances using a high speed data communication protocol.

The remote module 200 may be constructed of common integrated circuits available from a number of vendors. The Transmit/Receive integrated circuit 206 could be a digital data transceiver with programmable functions including power output, timing, frequency of operation, bandwidth, and other necessary functions. The operating frequency band may preferably be a frequency range which allows for unlicensed operation worldwide, for example, the 2.4 GHz range. The central processor 204, memory 205, and switch 210 can include any of a number of generic parts widely available. The A/D converter 203 could preferably be a 24-bit sigma delta converter such as those available from a number of vendors. The preamplifier 202 should preferably be a low-noise, differential input amplifier available from a number of sources, or alternatively integrated with the A/D converter 203. The D/A converter 208 should preferably be a very low distortion unit which is capable of producing low-distortion sine waves which can be used by the system to conduct harmonic distortion tests. The module 200 may include a number of other components not shown in FIG. 2, such as a directional antennae for angle-of-arrival signal measurements, separate transmit and receive antennae, separate antennae for location signals and seismic data transfer signals, GPS receivers, batteries, etc.

The following example depicts how the system can acquire seismic data continuously. Assume that every module is sampling the vibration signals at 500 samples per second with a resolution of 24 bits per sample. The seismic data from the vibration sensor is digitized and stored in memory. While this is taking place, the transceiver 206 is receiving data from the next module more remotely located to the central recording system. After some amount of data is collected from the sensor 201 and the other modules, the module switches to transmit mode and sends some packets of data collected from the sensor 201 and the other modules on towards a module closer to the central recording system. Each packet of data is also annotated with some identification as to the original source sensor and the time acquired. The module continues to acquire and store data during the transmit phase so there are no gaps in the record. The time stamp annotation may come from a clock in the microprocessor or the radio. The clocks in all the modules may be periodically adjusted and synchronized with a signal from the central recording system or other source.

When transmitting data between modules in a seismic survey system such as those depicted in FIG. 3 or FIG. 4, it may be appreciated that wireless modules may be located in an array such that any given wireless module may be within communication range of one or more adjacent wireless modules. That is, upon transmission of data from an acquisition module, multiple other modules in the array may be capable of receiving the transmission. Accordingly, the potential exists for modules not intended to be in communication with a transmitting module to be capable of receiving the transmission. In this regard, interference and cross talk may be experienced by modules in the array. In such instances of interference, it is often the case that the data transmitted may be corrupted such that the transmission must be repeated in order to achieve uncorrupted data transfer between the modules. This may result in bandwidth being utilized to retransmit data. This may result in a delay in data readout which may result in disadvantageously delaying the survey.

However, multiplexing signatures may be assigned to the various modules to reduce the potential for interference or cross talk between adjacent modules in the array. That is, while multiple modules may be within communication range, the use of unique multiplexing signatures between communicating modules within transmission range of one another may reduce the amount of interference experienced from adjacent modules that may be communicating using different respective multiplexing signatures. Such multiplexing regimes may include, for example, frequency division multiplexing, time division multiplexing, code division multiplexing, or other known methods of multiplexing for reducing interference between transmitting modules. In this regard, even adjacent modules that are capable of receiving transmissions from adjacent modules not intended to be in communication may disregard any signal not associated with a specific multiplexing signature. In this regard, interference may be avoided.

The use of such multiplexing regimes may be subject to regulation (e.g., by government agencies such as the Federal Communications Commission in the United States or other similar government actors that are tasked with regulation of radio-frequency communications of the kind contemplated herein). As such, regulations may exist to prevent exclusive utilization of one or more multiplexing signatures for using in communications (e.g. to the detriment of other users in the area in unlicensed bands). For example, a module may be required to "hop" or change multiplexing signature at regular intervals in order to comply with such regulations. Regulatory entities may also enforce regulations preventing the control of multiplexing signatures from a central location to prevent exclusive use of multiplexing signatures by coordinated monopolization of such regimes at a location. In this regard, it may be appreciated that the allocation and maintenance of multiplexing signatures in a wireless survey may be non-trivial and potentially burdensome.

Furthermore, despite use of unique multiplexing signatures within the array, the number of available multiplexing signatures may be limited. As such, in order to achieve the desired module density in the array, multiplexing signatures may be reused at different locations within the array. For example, a multiplexing signature may be assigned to modules not intended to be in communication that are still within communication range of one another. In this regard, the potential may still exist for modules in the array that are not intended to be in communication to interfere with each other due to the limited number of multiplexing signatures available for use requiring reuse of multiplexing signatures in the array.

However, each wireless module may be operable to discern a transmission originating at an adjacent module from an attenuated transmission originating at a module more distant than the adjacent module. That is, as radio waves propagate through space, the power density of the wave is generally inversely proportional to the square of the distance from the source. As such, the power density of a wave originating at a remote module will generally be less by an amount of the inverse square of the difference in distance from an adjacent module. As such, the RF wave originating at the remote module may be attenuated as compared to an RF wave originating at a more adjacent module.

Accordingly, the wireless modules may detect the difference in signal strengths by using co-channel rejection techniques. In co-channel rejection, a sufficient signal-to-noise ratio (SNR) allows the module to reject the more remote signal. For example, a SNR of a predetermined amount of attenuation between the adjacent signal and the remote to signal may allow for co-channel rejection of the remote signal. In one embodiment, a SNR of at least about 18.5 dB may be sufficient to allow for co-channel rejection of attenuated signals received on a common multiplexing signature from modules not intended for communication with the module. As such, so long as a transmission generated by another module in the array using a multiplexing signature is sufficiently remote from a communication partner of a module, the potentially interfering transmission may be rejected using co-channel rejection techniques. Accordingly, the distance between one module and another module reusing a multiplexing signature in the array is preferably as great as possible.

In this regard, one embodiment of multiplexing signature allocation may include utilizing the co-channel rejection of a remote signal in a distributed array to reject potentially interfering transmission. As the amount of attenuation of the remote, potentially interfering transmission may be related to the distance from a module, it will be appreciated that the greatest spacing possible between modules reusing a common multiplexing signature at any one time may assist in the co-channel rejection techniques by ensuring a sufficient SNR between the intended transmission and the potentially interfering transmission is provided to perform co-channel rejection. The separation between modules reusing a common multiplexing signature in the array may be achieved through allocation of a multiplexing sequence to the modules. This, coupled with recognition of adjacent use of multiplexing signatures by adjacent modules to modules in the array to take advantage of a given known spatial layout of modules in the array may facilitate distributed reuse of multiplexing signatures within an array.

For example, the modules in the array may each include a multiplexing signature table that employs a multiplexing sequence defined by a predetermined number of multiplexing signatures. One example of such an embodiment of a multiplexing signature table is illustrated in FIG. 5. FIG. 5 is a representation of the allocation of multiplexing signatures to a base station unit and a plurality of wireless modules comprising a subnet of the array at a plurality of time periods. Each successive row in the chart shown in FIG. 5 represents a subsequent time period. In this regard, time periods $t_0$-$t_{22}$ are represented in FIG. 5, however as may be appreciated in greater detail below, the multiplexing signature sequence for any given module in the array may be repetitive. In any regard, each successive row represents a successive period of time as noted in the figure, where subsequent time periods are represented sequentially moving downward in FIG. 5. A plurality of modules are represented in the columns of the table shown in FIG. 5. In this regard, the left-most column corresponds to a base station unit as described above with respect to the survey systems of FIGS. 3 and 4. Also, a subnet of wireless modules are represented in the columns progressing to the right in FIG. 5. As such, wireless modules 1-44 are represented in FIG. 5, although it will be appreciated that fewer or more wireless modules may be provided. Each subsequent module in the series of wireless modules 1-44 may correspond to a more remote module moving away from the base station unit. As such, for each time period $t_0$-$t_{22}$, the base station unit and each wireless module is shown as operating using a given multiplexing signature.

The multiplexing signatures in FIG. 5 are represented as numerical index values of 0-18 corresponding to 19 available multiplexing signatures. In this regard, it will be appreciated that an index value may be used to represent a multiplexing signature. It will be appreciated that additional or fewer multiplexing signatures may be provided and the number of signatures shown are for example only and not limiting. Furthermore, while numerical index values 0-18 are employed to denote the multiplexing signatures, it is not intended that the index values represent any characteristic regarding the multiplexing signature to which the index value corresponds. For example, each numerical index value 0-18 may correspond to a different frequency in a frequency spectrum that may be used as a multiplexing signature in the case of a frequency division multiplexing regime. In this regard, index value 1 may not necessarily correspond to a sequentially higher frequency in the frequency spectrum than index value 0. As such, the numerical index values 0-18 merely denote different available multiplexing signatures and don't necessarily correspond to any order of the corresponding multiplexing signatures represented by the numerical index values 0-18. As such, the sequence of index values from 0-18 may represent a pseudorandom sequence of multiplexing signatures.

In any regard, it may be appreciated that the base station unit may sequentially advance at each next time period through the multiplexing signatures corresponding to numerical index values 0-18. As such, multiplexing signature 0 is used by the base station unit at $t_0$, multiplexing signature 1 is used at $t_1$, etc. The base station unit may progress through all multiplexing signatures and repeat the sequence once all 19 signatures have been used in 19 successive time periods. Furthermore, it may be appreciated that in alternating successive time periods, the base station unit may communicate with wireless module 1 such that wireless module 1 and base station unit use corresponding multiplexing signatures during these time periods when the two modules are to communicate. That is, for example, at $t_0$, base station unit and wireless module 1 may communicate using multiplexing signature 0 and at $t_2$, base station unit and wireless module 1 may communicate using multiplexing signature 2. In the other alternating time periods, it will be understood that the base station unit may be communicating with another subnet not represented in FIG. 5. In this regard, the base station unit may receive data from alternating subnets potentially corresponding to different serial data transfer paths in the seismic array.

In any regard, each successive communication pair (i.e., modules sharing multiplexing signature for communication therebetween) may operate at a multiplexing signature offset from the previous and next communication pair. For example, at $t_0$, wireless modules 4 and 5 may communicate using multiplexing signature 8, while modules 2 and 3 communicate using multiplexing signature 4. In this regard, the multiplexing signature for each successive communication pair may be offset in the numerical index by a predetermined value (e.g., four in the case shown in FIG. 5).

It will be appreciated that using such an offset between adjacent communication pairs allows for different multiplexing signatures to be used by adjacent communication pairs in the array. In fact, it will be appreciated in FIG. 5, that the next communication pair utilizing the same multiplexing signature may be located the same number of communication pairs away from a common multiplexing signature as there are available multiplexing signatures for allocation to the modules. That, is in the example shown in FIG. 5, there are 19 available multiplexing signatures and a multiplexing signature is not reused in the subnet for a communication pair for 19 consecutive communication pairs in the serial data transfer path. Accordingly, assuming a distribution of the array where each successive module is more distant from the base station unit and the previous module in the subnet, the maximum distance is achieved between communication pairs operating on the same multiplexing signature. As such, given the power density of the transmission degrades in inverse proportion to the square of the distance of the transmission, it is more likely that a module in a given communication pair will be operable to perform co-channel rejection of the transmission associated with the next communication pair in the subnet reusing the multiplexing signature so that the communication between a given communication pair in the subnet may not experience interference based on other communication pairs reusing multiplexing signatures.

Furthermore, while FIG. 5 depicts one particular embodiment including a particular number of available multiplexing signatures and a particular offset number between adjacent communication pairs, it will be appreciated that other values may be provided. In fact, the characteristics described above wherein communication pairs reusing a multiplexing signature are located the same number of communication pairs away as the number of available multiplexing signatures generally holds true so long as the value by which adjacent communication pairs are offset is not a factor of the total number of multiplexing signatures available. In this regard, any number of multiplexing signatures and offset value may be employed to achieve the maximum spacing between modules so long as the number of multiplexing signatures is not a multiple of the offset value. As such, it may be particularly advantageous to provide a prime number of multiplexing signatures as any offset value could then be used to achieve the maximum spacing between common multiplexing signature use.

In an embodiment, the offset value for an adjacent module may be established by a processor (e.g., processor 204). In this regard, the processor at a module may be operable to detect an adjacent index value of another module to determine where in the index the adjacent module is operating. In this regard, the processor may select an index value for operation at a module based on the adjacent index value and an offset value. For example, upon initiation of the array (e.g., either during deployment or some time thereafter), each subsequent module in a serial data transfer line may initiate, determine an adjacent index value, and then establish an index value that is offset from the adjacent index value. In this regard, as each more remote module initiates, the index values for each subsequent module may be offset in the manner as shown in FIG. 5.

Figure 6:
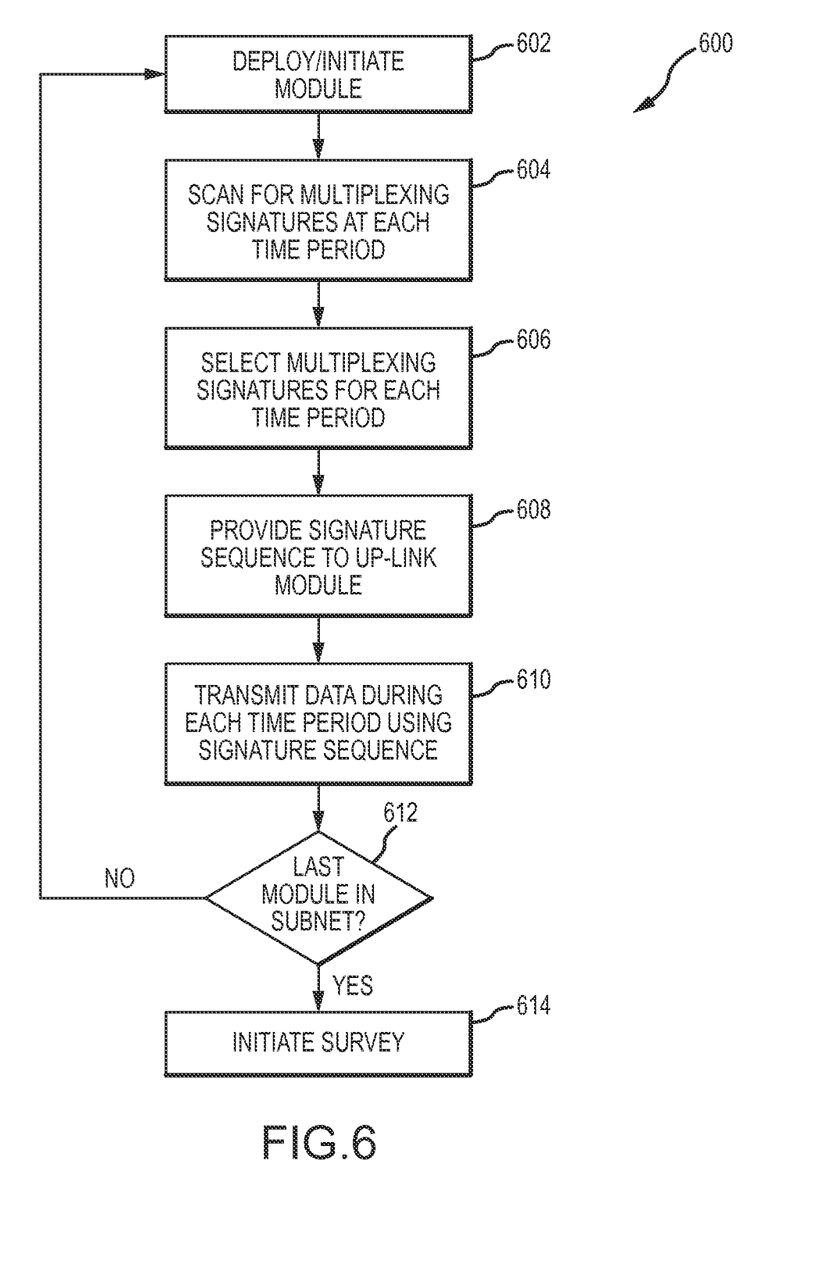
FIG. 6 is a flowchart depicting an approach to adaptive allocation of multiplexing signatures in an array.

In another embodiment, multiplexing signature allocation may be performed using an adaptive process. One such process 600 is generally depicted in FIG. 6. The process 600 of adaptive frequency allocation may begin with deployment or initialization 602 of a wireless module. In this regard, the module may be placed in a location in the array or may be in place and be initialized. The process 600 may be performed by any module in the array including a base station unit and/or a wireless acquisition module.

In any regard, the process 600 may also include scanning 604 at the module for the use of a plurality of predetermined multiplexing signatures. The scanning 604 may involve scanning a plurality of time periods corresponding to the number of available multiplexing signatures (i.e., if 19 multiplexing signatures are available for use, the scanning may continue for 19 consecutive time periods). Each of the predetermined multiplexing signatures may be scanned during each one of the time periods. In one embodiment, the duration of each time period corresponds to an allowable period for which the module may dwell on any single multiplexing signature before having to hop. For example, in one embodiment, each time period may be 8 ms in duration, which corresponds to the duration a module may use a multiplexing signature prior to hopping during the acquisition process.

In an embodiment, the adaptive frequency allocation process may include a first module scanning each of a plurality of available channels (e.g., frequencies). This may include listening for a relatively short period of time such as, for example, 150 μsec. During this time, the first module may record a power measurement (e.g., a received signal strength indication (RSSI)). For instance, the RSSI may be measured in dBm. It should be noted that the RSSI measurement may be measured on each channel regardless of whether any data packets are being transmitted (e.g., by other modules in the array) at that time. That is, the RSSI measurement does not require receipt of data packets but simply measures the power on the channel. Thus, even other sources of power on the channel (e.g., adjacent transmitters or other ambient noise) may be detected.

The first module may select the channel with the lowest RSSI and attempt to establish a link with a second module on the selected channel. As such, a neighboring second module may periodically scan each channel for a beacon signal. The first module may send such a beacon signal to the second module. If the beacon signal is received by the second module, the second module may respond with a beacon response, thus successfully establishing a link between the first and second modules. If the second module does not respond within a predetermined period of time to the beacon, the first module may select another channel (e.g., the channel with the next lowest RSSI) and resend a beacon on the other channel.

Upon establishing a link, the second module may then scan each available channel (e.g., frequency) and record the RSSI of each channel. The second module may send the information corresponding to the RSSI for each channel as recorded by the second module to the first module. The first module may then choose the optimal channel using both the measured RSSI from the first module and the measured RSSI from the second module. This may include creating a list of RSSI to channel correlations and choosing the maximum RSSI per channel from each module's measurements.

Using this RSSI to channel correlation based on both module's measurements, the first module may select the minimum RSSI. If this chosen channel is not the in-use channel (i.e., the channel on which the beacon and beacon response was transmitted), the first module may send a transmission to the second module regarding the change in channel. Additionally, if no channel satisfies the co-channel rejection requirements for the particular radios used by the modules, then an error message may be communicated (e.g., to a central control and recording station).

The foregoing process may be repeated by the second module. That is, in the second iteration of the foregoing process, the second module of the first iteration may become the first module of the second iteration of the process. In this regard, the process may be iteratively performed along a plurality of modules per the foregoing discussion regarding a first module and a second module. Furthermore, the foregoing process may be extended to frequency hopping. As such, the selected frequency may be used as a starting point in a predetermined frequency hopping sequence. Additionally or alternatively, the foregoing process may be used to adaptively select each of a plurality of subsequent hops in a multiplexing hopping sequence.

In one embodiment, the multiplexing signatures available may correspond to frequencies at which the module transmits and at which a receiving module in a communication pair listens. As such, each multiplexing signature may correspond to a unique frequency value in the spectrum. As such, during each time period, the module may tune to each available frequency and listen for energy (e.g., noise) at each frequency during each time period. The detected energy at the frequency may correspond to ambient noise that may correspond to, for example, other devices within transmission range or the presence of other radio-frequency energy corresponding to the multiplexing signatures. The ambient noise may originate at devices that are not associated with the seismic array or may originate at other modules within the array.

In any regard, the process 600 may further include selecting 606 a multiplexing signature for use at the module during each time period. The selecting 606 may be at least partially based on the scanning 604 step. In this regard, the scanning 604 step may provide information regarding the use of multiplexing signatures during the relevant time periods such that the module may select 606 a multiplexing signature for each time period to avoid interference with the multiplexing signatures detected during the scanning as much as possible.

Upon selection 606 of a multiplexing signature by the module for each time period corresponding to the number of available multiplexing signatures, the module may have populated a multiplexing sequence that corresponds to an optimized sequence of multiplexing signatures as determined from the scanning. This sequence may include one of the plurality of available multiplexing signatures being selected for one time period in the sequence. The sequence may be repeated by the module such that the sequence defines the multiplexing signatures to which the module will continually hop.

The module may then provide 608 at least a portion of the multiplexing sequence to an uplink acquisition module. In this regard, it may be appreciated that the module being configured by the process is tasked with receiving data from the uplink module in alternating time periods. As such, the module being configured may provide 608 the appropriate multiplexing sequence to be used to communicate between the module being configured and the uplink module. As such, the sequence provided by the module being configured to the uplink module may include a sequence corresponding to alternating time periods during which the uplink module and the module being configured are to be communicating.

In the case where the base station unit corresponds to the module being configured, the base station unit may provide 608 a first sequence to a first uplink module (e.g., belonging to a first subnet in communication with the base station unit) and a second sequence to a second uplink module (e.g., belonging to a second subnet in communication with the base station unit). In this regard, it will be appreciated that in the half duplex communication protocol the base station unit may communicate with the first uplink module in the first subnet at alternating time periods as the base station unit communicates with the second uplink module in the second subnet.

The process may further include transmitting 610 data using the shared multiplexing sequence provided by the module being configured. The transmitting 610 may include transmitting for substantially all of or the entirety of each time period using the selected multiplexing signature for a given time period. The data transmitted during each of these time periods may at least partially be data relevant to the operation of the survey such as, for example, seismic data and/or control data for operation of the array. However, at least a portion of the data may also be "white noise" or "filler noise." The white noise or filler noise may be otherwise useless data without another purpose in the array other than simply ensuring that the modules communicating using a given multiplexing signature at a given time period may be heard (e.g., by other modules later configured according to the process as will be discussed in greater detail below).

The process may also include determining 612 if the module being configured is the last module in the subnet. If the module is not the last module in the subnet, the process may continue such that the next module in the subnet is configured (i.e., the process 600 may be repeated for each module in the subnet or array). As such, once it is determined 612 that the last module in the subnet has been configured, the process may conclude and seismic data collection may initiate 614 such that data is transmitted between modules using the multiplexing signature sequences established by the process.

It may be further appreciated that the presence or absence of interfering noise at the module may be at least partially related to the location of the module. That is, if the module is located adjacent to interfering source, the interference may be present so long as the module is in that specific location. However, it may also be appreciated upon movement of the module, the presence or absence of interfering signals may change along with the location the module. In an embodiment, it may be the case that upon movement of module, it may be specifically advantageous to perform the adaptive frequency allocation process 600 to determine an optimal multiplexing sequence based on the change conditions associated with the movement of the module to a new location.

Figure 7:
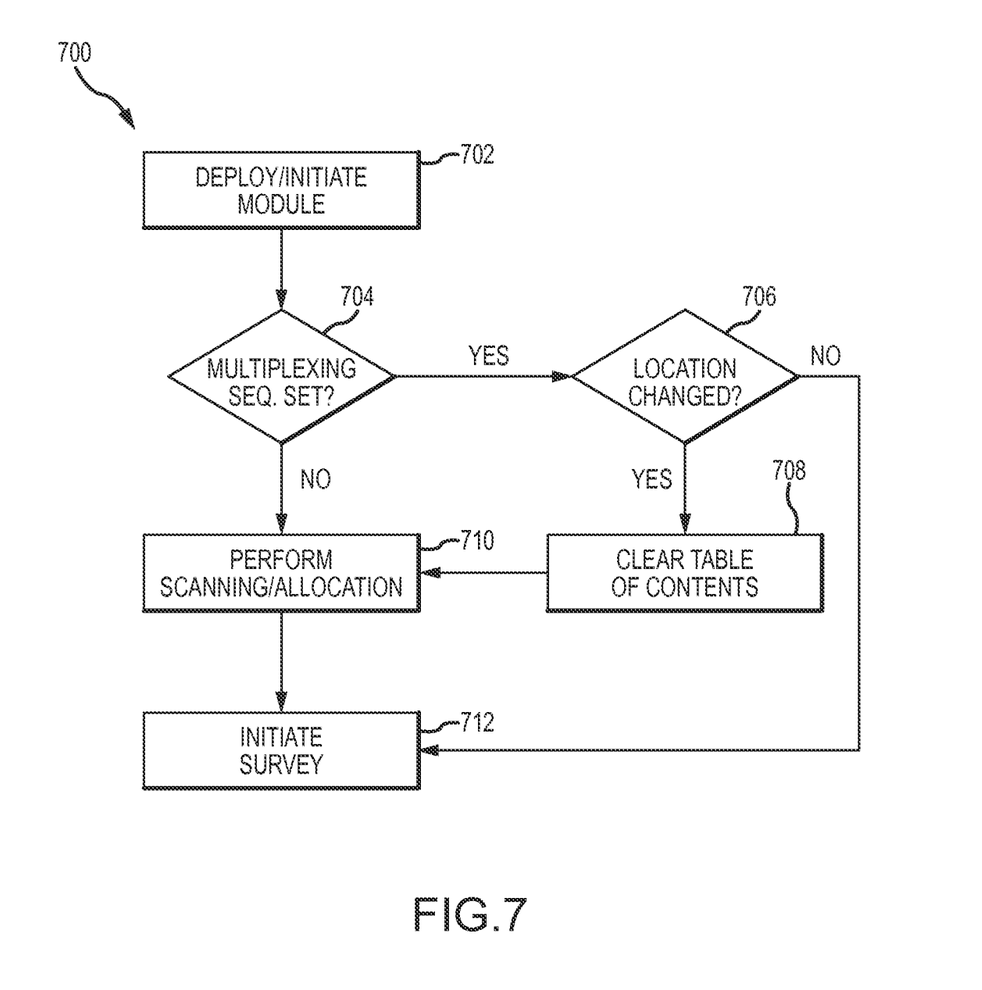
FIG. 7 is a flowchart depicting an approach to determining if adaptive allocation is to be performed upon initiation or deployment of a module.

In this regard, in an embodiment, a process 700 as depicted in FIG. 7 may be carried out such that upon movement of the module, the adaptive process may be performed to adaptively allocate multiplexing signatures to module. In this regard, the process 700 may begin with deployment or initiation 702 of the module. The process 700 may next include determining 704 whether a multiplexing sequence index table is established for the module (e.g., whether such a sequence is stored in the memory of the module). If no such multiplexing sequence index table is stored in the memory of the module, the process 700 may include performing 710 an adaptive process to allocate the modules (e.g., the module may perform the process 600 described above). If a multiplexing sequence index table has been stored in the memory of the module, the process 700 may include determining 706 whether the location of the module has changed since the multiplexing sequence index table was created. If it is determined 706 that the location the module has changed, the process may include clearing 708 (i.e., deleting) the table contents and then performing 710 an adaptive frequency allocation process. However, if the location has not changed, the process may proceed to initiate 712 the survey without again performing an adaptive frequency allocation process. That is, if upon initiation 702 of the module, a multiplexing sequence index table is stored at the module and the location the module has not changed since the table was created, the module may initiate 712 survey operations without again performing an adaptive frequency allocation process. This may make an assumption that because the location of the module is not changed, the ambient conditions in which the modules operating may have also not change such that the optimized frequency sequence determined in the previous adaptive frequency allocation process still remains the optimal allocation for multiplexing signatures at the module.

However, it is also recognized the presence or absence of interfering signals may change without movement of the module. In this regard, the adaptive process 600 described in FIG. 6 may occur at any time during the seismic data acquisition, regardless whether the modules moved. For example, an adaptive multiplexing signature allocation process may be performed periodically during the survey, on command, or at some other predetermined interval.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for adaptive allocation of multiplexing signatures comprising unique frequencies to a wireless module in a seismic data acquisition system, the method comprising:

first scanning with a first wireless module in the seismic data acquisition system to measure a received signal strength on each of a plurality of frequencies during each of a plurality of transmission time periods, wherein the plurality of transmission time periods each correspond to a different time period to which a unique frequency is to be assigned to define a multiplexing sequence through which the first wireless module repetitively progresses during transmission of data from the wireless module; and first selecting for each of the plurality of transmission time periods at the first wireless module a different respective one of the plurality of frequencies, wherein the selecting is based on the first scanning, and wherein the first selecting includes assigning a selected frequency to each time period of the multiplexing sequence to define the multiplexing sequence, and first transmitting data from the first wireless module by progressing repetitively through each of the plurality of transmission time periods using the assigned frequency for each of the plurality of transmission time periods of the multiplexing sequence of the first wireless module.

2. A method according to claim 1, wherein the first selecting includes choosing the different respective ones of the plurality of frequencies for each of the plurality of transmission time periods to minimize interference from competing presence of the received signal strength of each given one of the different respective frequencies based on the received signal strength measured during the first scanning.

3. A method according to claim 2, wherein the competing presence of at least one of the different respective frequencies corresponds to ambient interference.

4. A method according to claim 3, wherein the first wireless module provides information indicative of the multiplexing sequence to an upstream acquisition module with which the first wireless module communicates data during the first transmitting, wherein the first wireless module and the upstream acquisition module each use the assigned frequency in each time period in the multiplexing sequence when communicating seismic data therebetween.

5. A method according to claim 4, wherein the first transmitting comprising communicating data between the first wireless module and the upstream wireless module using the multiplexing sequence such that each assigned frequency of the multiplexing sequence is used for the entirety of the respective transmission time period for which the assigned frequency has been selected.

6. A method according to claim 5, wherein at least a portion of the communication between the first wireless module and the upstream wireless module comprises idle data.

7. A method according to claim 5, further comprising:
second scanning during the first transmitting at a second wireless module in the seismic data acquisition system to measure the received signal strength of each of the plurality of frequencies during each of the plurality of transmission time periods; and
second selecting for each of the plurality of transmission time periods at the second wireless module a different respective one of the plurality of frequencies, wherein the second selecting is based on the second scanning, and wherein the second selecting includes assigning a selected frequency to each time period of the multiplexing sequence at the second wireless module to define a second multiplexing sequence for the second wireless module wherein the second selecting includes assigning a different one of the plurality of frequencies than corresponding ones of the first multiplexing sequence for use during each of the transmission time periods based on detection of the assigned frequencies used by the first wireless module during each of the plurality of transmission time periods in the second scanning to develop the second multiplexing sequence for the second wireless module; and
second transmitting data from the second wireless module by progressing repetitively through each of the plurality of transmission time periods using the assigned frequency for each of the plurality of transmission time periods of the multiplexing sequence of the second wireless module.

8. A method according to claim 7, wherein the second acquisition module comprises the upstream acquisition module.

9. A method according to claim 1, wherein each acquisition module in the seismic data acquisition system chooses a corresponding multiplexing signature sequence by sequentially performing corresponding scanning and selecting steps.

10. A method according to claim 9, wherein the corresponding multiplexing signature sequence is stored by each corresponding one of the plurality of wireless modules at least until a location of the wireless module is changed.

11. A method according to claim 1, wherein said method is performed prior to initiation of a seismic survey.

12. A method according to claim 1, wherein said method is performed during a seismic survey.

13. A method for allocation of multiplexing signatures to a plurality of wireless modules in a seismic data acquisition system, comprising:
programming each of said plurality of wireless modules with a multiplexing sequence, wherein the multiplexing sequence defines a plurality of time period each having a different assigned frequency and defining a receptive sequence through which the wireless module progresses during transmission of data from the wireless module;
deploying each of said plurality of wireless modules in a survey area, wherein at least a portion of said plurality of wireless modules in the survey area are capable of interference, and wherein said plurality of wireless modules comprise a substantially ordered pattern in the survey area;
first transmitting data at a first wireless module of the plurality of wireless modules using a first multiplexing signature of multiplexing sequence in a first time period; and
second transmitting data at a second wireless module of the plurality of wireless modules using the first multiplexing signature of the multiplexing sequence in the first time period, wherein at least a portion of the first transmitting and the second transmitting both occur in the first time period;
wherein the first wireless module and the second wireless module are physically separated within the substantially ordered pattern of wireless modules by a number of transmitting module pairs equal to the number of multiplexing signatures in the multiplexing sequence such that the physical distance between the first wireless module and the second wireless module in the survey area is sufficiently large such that first wireless module and second wireless module reject interfering transmission from one another using co-channel rejection of the interfering transmission, and wherein each adjacent transmitting pair of wireless modules of the plurality of wireless modules are separated within the multiplexing sequence for any given transmission period by a number of index positions that is not a factor of a total number of multiplexing signatures in the multiplexing sequence to achieve the sufficiently large physical distance between each potentially interfering module pair in the seismic array.

14. The method according to claim 13, wherein the total number of multiplexing signatures in the multiplexing sequence is a prime number, and wherein the number of index positions is greater than 1 and less than the total number of multiplexing signatures in the multiplexing sequence.

15. The method according to claim 13, wherein the programming includes providing each module instructions regarding an offset relative to an index value corresponding to the multiplexing sequence.

16. A wireless module for use in a seismic survey, comprising:
- a seismic sensor operable to detect seismic energy and generate seismic data corresponding to the detected seismic energy;
- a transceiver in operative communication with the sensor to wirelessly communicate the seismic data to at least one of another wireless acquisition module or a data collection unit;
- a memory storing a multiplexing sequence, wherein the multiplexing sequence includes a plurality of frequencies each referenced by a corresponding index value, the multiplexing sequence comprising a plurality of transmission time periods each having a different assigned index value referencing a different assigned frequency for each of the plurality of time periods that define a repetitive sequence through which the transceiver repetitively progresses;
- a processor in operative communication with the transceiver to control operation thereof, wherein the processor operates to;
   - receive an indication of an adjacent index value used by an adjacent module from the adjacent wireless module that is more adjacent to a data collection unit than the wireless module,
   - select the index value to assigned frequency for each of the plurality of time periods based on the adjacent index value such that the selected index value is an offset from the adjacent index value to defined the multiplexing sequence stored in the memory such that the physical distance between the wireless module and the adjacent module in the survey area is sufficiently large such that wireless module and adjacent module reject interfering transmission from one another using co-channel rejection of the interfering transmission, and
   - transmit data from the transceiver by reading the multiplexing sequence from the memory to controlling the transceiver to transmit the data using the assigned frequency for each of the plurality of time periods in the repetitive sequence defined by multiplexing sequence;
- wherein the total number of multiplexing signatures in the multiplexing sequence is not a multiple of the value of the offset.

17. A method for adaptive allocation of multiplexing signatures comprising a plurality of different frequencies to a plurality of wireless modules in a seismic data acquisition system, comprising:
- first scanning with a first wireless module in the seismic data acquisition system to measure a received signal strength of each of the plurality of different frequencies during a first transmission time period in a first repetition of a multiplexing sequence, the first transmission time period comprising one of a plurality of time periods of the multiplexing sequence through which the first wireless module repetitively progresses;
- first selecting at the first wireless module a first selected frequency of the plurality of frequencies for assignment to first wireless module in the first transmission time period in a second repetition of the multiplexing sequence, wherein the first selecting includes choosing the first selected frequency of the plurality of frequencies such that the first selected frequency has the lowest received signal strength of the plurality of frequencies during the first transmission time period of the first repetition of the multiplexing sequence;
- first transmitting data from the first wireless module using the first selected frequency of the plurality of frequencies assigned to the first wireless module in the first transmission time period during a second repetition of the multiplexing sequence;
- second scanning with a second wireless module in the seismic array to measure a received signal strength of each of the plurality of frequencies during the first transmission time period of the second repetitive of the multiplexing sequence in which the first transmitting occurs, wherein the second scanning includes identifying the first selected frequency of the plurality of multiplexing signatures corresponding to the first transmitting from the first wireless module;
- second selecting at the second wireless module a second selected frequency of the plurality of multiplexing signatures for assignment to the second wireless module in the first transmission time period in another repetitive of the multiplexing sequence, the second selected frequency being different than the first selected frequency of the plurality of multiplexing signatures, wherein the second selecting includes choosing the second selected frequency of the plurality of frequencies such that the second selected frequency has the lowest received signal strength of the plurality of frequencies during the first transmission time period of the second repetitive of the multiplexing sequence; and
- second transmitting seismic data from the second wireless module using the second selected frequency of the plurality of frequencies assigned to the second wireless module in the first transmission time period during the another repetition of the multiplexing sequence in which the first wireless module transmits seismic data using the first selected one of the plurality of multiplexing signatures in the first transmission time period of the another repetition of the multiplexing sequence.

18. The method of claim 17, wherein the first selecting includes choosing the first selected frequency of the plurality of frequencies to minimize interference from competing measured signals detected during the first scanning, and wherein the competing measured signals detected during the first scanning include ambient interference.

19. The method of claim 17, wherein said method is performed prior to initiation of a seismic survey.

20. The method of claim 17, wherein said method is performed during a seismic survey.

* * * * *